United States Patent
Shin et al.

(10) Patent No.: US 11,989,916 B2
(45) Date of Patent: May 21, 2024

(54) RETRO-TO-MODERN GRAYSCALE IMAGE TRANSLATION FOR PREPROCESSING AND DATA PREPARATION OF COLORIZATION

(71) Applicant: KYOCERA Document Solutions, Inc., Osaka (JP)

(72) Inventors: Kilho Shin, Los Angeles, CA (US); Dongpei Su, Palos Verdes, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 416 days.

(21) Appl. No.: 17/498,269

(22) Filed: Oct. 11, 2021

(65) Prior Publication Data

US 2023/0114402 A1   Apr. 13, 2023

(51) Int. Cl.
*G06T 7/90* (2017.01)
*G06N 20/00* (2019.01)
*G06T 11/00* (2006.01)

(52) U.S. Cl.
CPC ............. *G06T 7/90* (2017.01); *G06N 20/00* (2019.01); *G06T 11/001* (2013.01); *G06T 2207/20076* (2013.01); *G06T 2207/20081* (2013.01); *G06T 2207/20084* (2013.01)

(58) Field of Classification Search
CPC ............ G06T 7/90; G06T 11/001; G06T 2207/20076; G06T 2207/20081; G06T 2207/20084; G06T 11/00; G06T 5/50; G06T 11/60; G06T 2207/20221; G06T 2200/24; G06T 2207/10024; G06T 7/11; G06T 5/00; G06T 2207/20016; G06T 15/04; G06T 5/77; G06N 20/00; G06N 3/045; G06N 3/0464; G06N 3/047; G06N 3/0475; G06N 3/09; G06N 3/096; G06N 3/08; G06N 3/084; G06N 3/088; G06N 3/04; G06N 3/048; G06N 3/0455; G06N 3/094; G06V 10/82; G06V 10/454
See application file for complete search history.

(56) References Cited

U.S. PATENT DOCUMENTS

| | | | | |
|---|---|---|---|---|
| 10,997,752 | B1 * | 5/2021 | Yoo | G06T 11/00 |
| 11,024,060 | B1 * | 6/2021 | Ma | G06V 20/20 |
| 11,341,699 | B1 * | 5/2022 | Gottlieb | G06N 20/00 |
| 11,514,261 | B2 * | 11/2022 | Liao | G06T 7/90 |

(Continued)

OTHER PUBLICATIONS

"Guided neural style transfer for shape stylization"; Atarsaikhan Gantugs, PLoS One, 15(6), e0233489, Jun. 4, 2020 (Year: 2020).*

(Continued)

*Primary Examiner* — Michael S Osinski
(74) *Attorney, Agent, or Firm* — GrowIP Law Group LLC (57) ABSTRACT

Embodiments provide an automated approach for generating unbiased synthesized image-label pairs for colorization training of retro photographs. Modern grayscale images with corresponding color images are translated to images with the characteristics of retro photographs, thereby producing training data that pairs images with the characteristics of retro paragraphs with corresponding color images. This training data can then be employed to train a deep learning model to colorize retro photographs more effectively.

20 Claims, 4 Drawing Sheets

(56) References Cited

U.S. PATENT DOCUMENTS

| | | | | |
|---|---|---|---|---|
| 11,776,097 | B2* | 10/2023 | Huang | G06N 3/045 |
| | | | | 382/156 |
| 11,783,461 | B2* | 10/2023 | Lu | G06N 3/08 |
| | | | | 382/156 |
| 11,790,486 | B2* | 10/2023 | Noh | G06T 3/18 |
| 11,790,558 | B1* | 10/2023 | Balakrishnan | G06T 11/00 |
| | | | | 382/154 |
| 11,803,950 | B2* | 10/2023 | Li | G06N 3/04 |
| 11,825,231 | B2* | 11/2023 | Cyrus | G06T 7/194 |
| 11,880,913 | B2* | 1/2024 | Hertzmann | G06N 3/045 |
| 2005/0213125 | A1 | 9/2005 | Smith et al. | |
| 2016/0364625 | A1* | 12/2016 | Lin | G06T 7/60 |
| 2017/0213112 | A1* | 7/2017 | Sachs | G06N 3/045 |
| 2018/0082715 | A1* | 3/2018 | Rymkowski | G06V 20/10 |
| 2018/0204336 | A1* | 7/2018 | Fang | G06T 7/40 |
| 2018/0240257 | A1* | 8/2018 | Li | G06V 10/774 |
| 2018/0285679 | A1* | 10/2018 | Amitay | G06T 5/50 |
| 2018/0357800 | A1* | 12/2018 | Oxholm | G06T 11/001 |
| 2019/0026870 | A1* | 1/2019 | Hu | G06T 5/77 |
| 2019/0147320 | A1 | 5/2019 | Mattyus et al. | |
| 2019/0147582 | A1 | 5/2019 | Lee et al. | |
| 2019/0228587 | A1* | 7/2019 | Mordvintsev | G06T 19/20 |
| 2019/0244329 | A1* | 8/2019 | Li | G06T 5/70 |
| 2019/0279346 | A1* | 9/2019 | Zhang | G06T 5/50 |
| 2019/0333198 | A1* | 10/2019 | Wang | G06N 3/045 |
| 2019/0370936 | A1* | 12/2019 | Zhang | G06F 18/213 |
| 2020/0013205 | A1* | 1/2020 | Kavidayal | G06T 11/40 |
| 2020/0051303 | A1* | 2/2020 | Li | G06N 3/045 |
| 2020/0082249 | A1* | 3/2020 | Hua | G06N 3/045 |
| 2020/0134778 | A1* | 4/2020 | He | G06V 10/82 |
| 2020/0134834 | A1* | 4/2020 | Pao | G06T 7/11 |
| 2020/0151849 | A1* | 5/2020 | Liao | G06T 3/18 |
| 2020/0151938 | A1* | 5/2020 | Shechtman | G06N 3/045 |
| 2020/0202502 | A1* | 6/2020 | Tsymbalenko | G06T 5/50 |
| 2020/0219274 | A1* | 7/2020 | Afridi | G06N 20/00 |
| 2020/0258204 | A1* | 8/2020 | Fang | G06T 3/40 |
| 2020/0357143 | A1* | 11/2020 | Chiu | G06F 18/253 |
| 2021/0104017 | A1* | 4/2021 | Baijal | G06T 3/4038 |
| 2021/0209464 | A1* | 7/2021 | Bala | G06N 20/00 |
| 2021/0358164 | A1* | 11/2021 | Liu | G06N 3/088 |
| 2021/0365710 | A1* | 11/2021 | Zhu | G06T 11/60 |
| 2021/0382936 | A1* | 12/2021 | Tomar | G06N 20/00 |
| 2022/0156987 | A1* | 5/2022 | Chandran | G06T 11/001 |
| 2022/0172322 | A1* | 6/2022 | Prins | G06T 5/50 |
| 2022/0198691 | A1* | 6/2022 | Chen | G06V 10/25 |
| 2022/0237830 | A1* | 7/2022 | Khodadadeh | G06N 3/045 |
| 2022/0245961 | A1* | 8/2022 | Yan | G06V 40/162 |
| 2022/0301227 | A1* | 9/2022 | Kanazawa | G06T 11/001 |
| 2022/0311981 | A1* | 9/2022 | Landy | G06T 7/90 |
| 2022/0377257 | A1* | 11/2022 | Wilson | G06N 20/00 |
| 2023/0082050 | A1* | 3/2023 | Li | G06T 11/001 |
| 2023/0086573 | A1* | 3/2023 | Naito | G06V 10/454 |
| | | | | 382/155 |
| 2023/0104127 | A1* | 4/2023 | Babagholami Mohamadabadi | |
| | | | | G06V 10/774 |
| | | | | 382/156 |
| 2023/0109732 | A1* | 4/2023 | Hertzmann | G06N 3/047 |
| | | | | 345/427 |
| 2023/0126800 | A1* | 4/2023 | Chen | G06V 10/82 |
| | | | | 382/108 |
| 2023/0154165 | A1* | 5/2023 | Park | G06N 3/088 |
| | | | | 382/128 |
| 2023/0162409 | A1* | 5/2023 | Yu | G06T 7/11 |
| | | | | 345/660 |
| 2023/0177643 | A1* | 6/2023 | Yang | G06T 3/4053 |
| | | | | 382/156 |
| 2023/0342884 | A1* | 10/2023 | Singh | G06N 3/045 |
| 2023/0388518 | A1* | 11/2023 | Pfaff | G06N 3/045 |
| 2023/0401682 | A1* | 12/2023 | Hu | G06V 10/774 |
| 2023/0410249 | A1* | 12/2023 | Noh | G06T 5/50 |
| 2024/0013357 | A1* | 1/2024 | Yabuuchi | G06V 40/168 |

OTHER PUBLICATIONS

"A Survey of Research on Image Style Transfer Based on Deep Learning"; Qiqi Shang, 2021 3rd International Conference on Artificial Intelligence and Advanced Manufacture (AIAM) (pp. 386-391), Oct. 1, 2021 (Year: 2021).*

"CNN-Based Image Style Transfer and Its Applications"; Nanhao Jin, 2020 International Conference on Computing and Data Science (CDS) (pp. 387-390), Aug. 1, 2020 (Year: 2020).*

"Image Style Transfer based on Generative Adversarial Network"; Chan Hu, 2020 IEEE 4th Information Technology, Networking, Electronic and Automation Control Conference (ITNEC) (vol. 1, pp. 2098-2102), Jun. 1, 2020 (Year: 2020).*

Zhu J.Y., Isola P., & Efros A.A. Unpaired image-to-image translation using cycle-consistent adversarial networks. Proceedings of the IEEE International Conference on Computer Vision (2017) p. 2223-32.

* cited by examiner

RETRO-TO-MODERN GRAYSCALE IMAGE TRANSLATION FOR PREPROCESSING AND DATA PREPARATION OF COLORIZATION

BACKGROUND

Colorization generally refers to a process that adds color to a black-and-white photograph or other images. By reducing the need for human intervention, automated colorization of photographs can provide an efficient and low cost approach for transforming old monochrome photographs to colorized photographs. Attempts to achieve effective automated colorization with conventional computer vision methods, however, have been largely unsuccessful due to the complex and multi-modal nature of the problem.

SUMMARY

Automated colorization can be achieved with supervised learning, where the model learns how to improve colorization of a grayscale image by comparing the grayscale image with its corresponding true color reference image (also known as label or ground truth). The success of automated colorization with a deep learning model depends on a comprehensive and preferably well-labeled training set, i.e., training data that pairs grayscale images with corresponding true color reference images. In many cases, preparing training data with paired images may be impractical and extremely difficult. In particular, a challenge for automated colorization is that corresponding true color images are not available for many old grayscale images. For supervised learning, modern color images are converted to grayscale images to produce a large collection of image-label pairs to train the model. Grayscale images that are synthesized for training in this way, however, have very different characteristics from monochrome images in retro photographs, which are often selected for colorization. Retro photographs refer to old photographs which may have been taken more than a couple of decades ago, e.g., with a conventional camera and film. Images from retro photographs may be different from modern grayscale images, because retro photographs often include a lot of noise, have a different type of grayscale (e.g., sepia or cyanotype monochrome), appear overexposed, and have less contrast or more softness due to lower resolution. Due to the differences between the images in actual retro photographs and grayscale images synthesized for training, deep learning models, which are data driven, may produce poor colorization of retro photographs. Accordingly, it is not effective to use these synthesized grayscale images to train a deep learning model to process (e.g., colorize) images from retro photographs.

According to an example embodiment, a method for processing images to achieve automated colorization includes providing a set of initial first images and providing a set of initial second images. Each initial first image presents a respective subject according to a first style X, and the first style X includes one or more first visual features. Each initial second image presents a respective subject according to a second style Y. The respective subjects of the initial second images are different from the respective subjects of the initial first images. The second style Y includes one or more second visual features that are different from the one or more first visual features of the first style X The method includes implementing a first generator G in a computer processing system to produce a set of generated first images based on the set of initial first images. The method includes implementing a second generator F in the computer processing system to produce a set of generated second images based on the set of initial second images. The method includes implementing one or more training functions to train the first generator G and the second generator F based on the generated first images and the generated second images, such that: (i) each generated first image produced by the first generator G presents the subject of a respective one of the initial first images according to the second style Y, and (ii) each generated second image produced by the second generator F presents the subject of a respective one of the initial second images according to the first style X.

The method above may also include implementing a first critic in the computer processing system to: receive a first random image from the set of initial first images or the set of generated second images based on the set of initial second images, and judge whether the first random image has been produced by the second generator F. Additionally, the example method above may include implementing a second critic in the computer processing system to: receive a second random image from the set of initial second images or the set of generated first images based on the set of initial first images, and judge whether the random second image has been produced by the first generator G. The one or more training functions includes an adversary loss function that is implemented to: (i) train the second generator F to increase a probability that the first critic judges the generated second images have not been produced by second generator F, and (ii) train the first generator G to increase a probability that the second critic judges the generated first images have not been produced by the first generator G.

The method above may also include implementing the second generator F to produce a set of reconstructed first images based on the set of generated first images, and implementing the first generator G to produce a set of reconstructed second images based on the set of generated second images. The one or more training functions includes a cycle-consistency loss function that is implemented to train the first generator and the second generator by: (i) minimizing a first loss between the initial first images and the corresponding reconstructed first images, and (ii) minimizing a second loss between the initial second images and the corresponding reconstructed second images.

In an example implementation, the one or more first visual features of the first style X may relate to those found in images from retro photographs, and the one or more second visual features of the second style Y may relate to those found in modern grayscale images. Accordingly, modern grayscale images with corresponding color images can be translated to images with the characteristics of retro photographs, thereby producing training data that pairs images with the characteristics of retro paragraphs with corresponding color images. This training data can then be employed to train a deep learning model to colorize retro photographs more effectively. Thus, the example method may include combining the generated second images in the first style X with colorized images based on the corresponding initial second images to generate a training dataset for a colorization model that colorizes images in the first style X.

Another example embodiment includes a system for processing images to achieve automated colorization. The system includes one or more computer storage devices configured to store the first generator G and the second generator F described above. The system includes one or more processors configured to execute instructions, the instructions causing the one or more processors to execute aspects of the method above.

Yet another example embodiment for processing images to achieve automated colorization includes one or more non-transitory computer-readable storage media, having computer-executable instructions stored thereon, wherein when executed by a one or more processors, the instructions cause the one or more processors to execute aspects of the method above.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of illustrative examples of the present disclosure when read in conjunction with the accompanying figures, wherein:

DETAILED DESCRIPTION

Colorization generally refers to a process that adds color to a black-and-white photograph or other images. By reducing the need for human intervention, automated colorization of photographs can provide an efficient and low cost approach for transforming old monochrome photographs to color photographs. Attempts to achieve effective automated colorization with conventional computer vision methods have been largely unsuccessful due to the complex and multi-modal nature of the problem. Deep learning, however, provides an effective approach to automated colorization.

Image-to-image translation generally refers to a task of translating a part of an image from one domain to another while keeping other parts of the image unchanged. For example, an image of a horse in a pasture can be translated to an image of a zebra in the same pasture. Typically, a dataset of paired images is required for training a deep learning model that performs image-to-image translation. For example, a paired image may include an input image in one domain (e.g., a shoe represented by a line drawing) and the same input image in another domain (e.g., the same shoe represented in a photograph).

Automated colorization can be achieved with supervised learning, where the model learns how to improve colorization of a grayscale image by comparing the grayscale image with its corresponding true color reference image (also known as label or ground truth). The success of automated colorization with a deep learning model depends on a comprehensive and preferably well-labeled training set, i.e., training data that pairs grayscale images with corresponding true color reference images.

Figure 1:
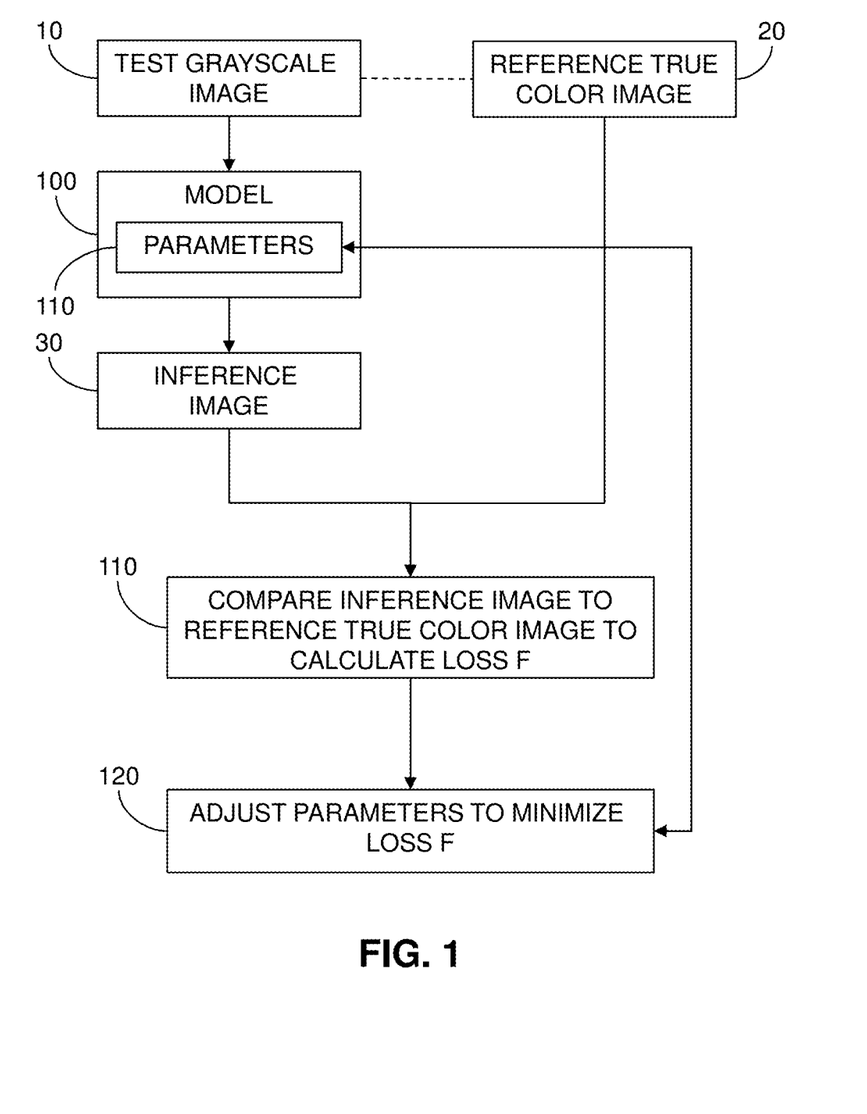
FIG. 1 illustrates an example deep learning model employing supervised learning for colorization.

FIG. 1 illustrates an example deep learning model 100 employing supervised learning for colorization. The model 100 receives a test grayscale image 10 as input. The test grayscale image 10 is associated with a true color reference image x̂. For the given test grayscale image 10, the model 100 produces an inference image 30 according to a set of parameters 102. In particular, the model 100 learns and stores the parameters 102 as grayscale-to-color information and returns color information probability based on inference for grayscale objects in the test grayscale image 100. The inference image 30 is supposed to be a colorization of the test grayscale image 10. In a training step 110, the inference image 30 is compared to the true color reference image 20 to calculate a loss (F(|ground truth−inference image|)). In a training step 120, the parameters 102 are adjusted to minimize the value of the loss F. The training process can iteratively adjust the parameters 102 until the model 100 generates an acceptable inference image 30 for the test grayscale image 10. The model 100 can be trained with a plurality of test grayscale images, but the model 100 shows better results with colorization inference when a grayscale image is similar to the test grayscale images used for training.

In many cases, preparing a dataset of paired images may be impractical and extremely difficult. In particular, a challenge for automated colorization is that corresponding color images are not available for many old grayscale images. For supervised learning, modern color images are converted to grayscale images to produce a large collection of image-label pairs to train the model. Grayscale images that are synthesized for training in this way, however, have very different characteristics from monochrome images in retro photographs, which are often selected for colorization. Retro photographs refer to old photographs which may have been taken more than a couple of decades ago, e.g., with a conventional camera and film. Images from retro photographs may be different from modern grayscale images, because retro photographs often include more noise, have a different type of grayscale (e.g., sepia or cyanotype monochrome), appear overexposed, and have less contrast or more softness due to lower resolution. Due to the differences between the images in actual retro photographs and grayscale images synthesized for training, deep learning models, which are data driven, may produce poor colorization of retro photographs. Accordingly, it is not effective to use these synthesized grayscale images to train a learning model to process (e.g., colorize) images from retro photographs.

To generate better data for training deep learning models, some attempt to mimic images from retro photographs by adding noise, blurring, and/or background structures to modern grayscale images. Generating these imitation retro photographs, however, requires significant human guidance and reliance on subjective knowledge and assumptions. Moreover, this approach is not effective in producing training data that comprehensively captures the many different characteristics of various types of retro photographs.

To generate better training data through a more automated approach, aspects of the present disclosure employ Cycle-Consistent Adversarial Networks (CycleGAN) to translate images with the characteristics of retro photographs to images with the characteristics of modern grayscale images ("modernization"), or conversely, translate images with the characteristics of modern grayscale images to images with the characteristics of retro photographs ("oldification"). CycleGAN provides a model that can be trained to translate images from one domain (e.g., having characteristics of retro photographs) to another domain (e.g., having characteristics of modern grayscale images) without paired training data (i.e., corresponding images from both categories), i.e., unpaired image-to-image translation. For example, after training a CycleGAN model with images of a Monet painting and other unrelated images from modern photographs, the CycleGAN model can translate images from a modern photograph to have the characteristics or style of a Monet painting, or vice versa. Advantageously, CycleGAN does not require human guidance and does not rely on subjective knowledge and assumptions. Thus, CycleGAN provides an automated approach for generating unbiased synthesized image-label pairs for colorization training. Any two different sets of unrelated images can be used to derive notable features of each set of images, and images from one set can be processed to have the features of the other set. For example, modern grayscale images with corresponding color images can be translated to images with the characteristics of retro photographs, thereby producing training data that pairs images with the characteristics of retro paragraphs with corresponding color images. This training data can then be employed to train a deep learning model to colorize retro photographs more effectively.

Figure 2:
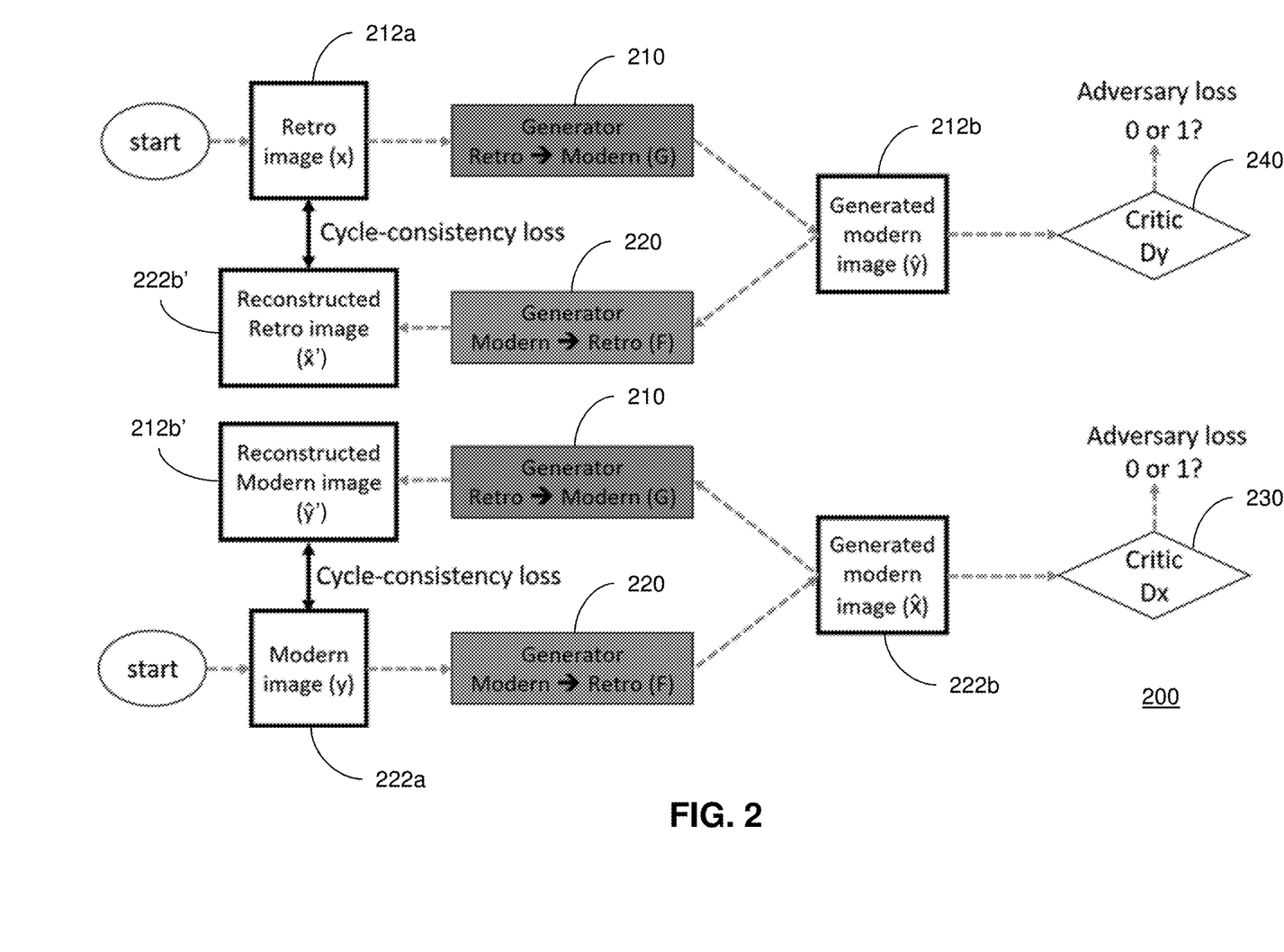
FIG. 2 illustrates an example implementation of Cycle-Consistent Adversarial Networks (CycleGAN).

FIG. 2 illustrates an example implementation 200 of CycleGAN. To train the CycleGAN for unpaired image-to-image translation, two sets of images are employed: one set of images in style (domain) X and one set of images in style (domain) Y. The implementation 200 includes a generator G (210), which receives and translates an image x (212a) in the style X to an image ŷ (212b) in the style Y, i.e., ŷ=G(x), with the objective that the image ŷ (212b) is indistinguishable from a real image in the style Y. The implementation 200 includes a generator F (220), which receives and translates an image y (222a) in the style Y to an image x̂ (222b) in the style X, i.e., 2=F(y), with the objective that the image x̂ (222b) is indistinguishable from a real image in the style X.

The generator G (210) and the generator F (220) each include an encoder and a decoder. The encoder employs three convolution layers, all followed by batch normalization, and Rectified Linear Unit (ReLU) activations. In some cases, the input images may be modified and rectified to 256×256 resolution due to performance on a graphics processing unit (GPU) and fed to the encoder. The convolution layers of the encoder change from wide and shallow layers to narrow and deep layers. The decoder includes two transposed convolution layers, similar to the convolution layers of the encoder, except the transposed layers change from narrow and deep layers to wide and shallow layers. The size of output image is the same as that of the input image.

The implementation 200 includes a critic $D_x$ (230) to judge whether a given image is a real image in style X, such as the image x (212a), or a generated image in style X, such as the image X (222b). The critic $D_x$ (230) can randomly receive the image x (212a) or the image x̂ (222b) as input and judge whether the input was generated by the generator F (220) or not. The implementation 200 also includes a critic $D_y$ (240) to judge whether a given image is from a real image in style Y, such as the image y (222a), or a generated image in style Y, such as the image ŷ (212b). The critic $D_y$ (240) can randomly receive the image y (222a) or the image ŷ (212b) as input and judge whether the input was generated from the generator G (210) or not. The critic $D_x$ and the critic $D_y$ each include four convolution layers, all followed by batch normalization, and Leaky ReLU activations.

The generator F (220) is trained to generate the image x̂ (222b) to "fool" the critic $D_x$ into judging that the image x̂ (222b) is a real image in the style X The generator G (210) is trained to generate the image ŷ (212b) to "fool" the critic $D_y$ (240) into judging that the image ŷ (212b) is a real image in the style Y. This training function is called an adversary loss function. In particular, the adversary loss function maximizes the average of the log probability of retro images and the log of the inverse probability for retro images and the average of the log probability of modern grayscale images and the log of inverse probability for modern grayscale images, i.e., max((log $D_y$(y)+log(1−$D_y$(G(x))))+(log $D_x$(x)+log(1−$D_x$(F(y))))).

In addition to the adversary loss function, the implementation 200 employs a cycle-consistency loss function as also shown in FIG. 2. The image x (212a) in the style X is translated to the image)) (212b) by the generator G (210) and the image ŷ is translated again to a reconstructed image x̂' (222b') by the generator F (220), i.e., x̂'=F(G(x)). The generator G (210) and the generator F (220) are trained to minimize the cycle-consistency loss between the image x (212a) and the image x̂' (222b'), i.e., min(abs(x−x̂')). Similarly, the image y (222a) is translated to the image x̂ (222b) by the generator F and image x̂ (222b) is translated to a reconstructed image y' (212b') by the generator G, i.e., ŷ'=G(F(y))). Then, the generator G (210) and the generator F (220) are trained to minimize the cycle-consistency loss between the image y and the image y', i.e., min(abs(y−ŷ')). In particular, the cycle-consistency loss function minimizes the sum of difference between (i) actual retro images x and reconstructed retro images x̂' and (ii) actual modern grayscale images y and reconstructed modern grayscale images ŷ', i.e., min((abs(x−x̂))+(abs(y−ŷ)))

With the adversarial loss function and the cycle-consistency loss function, the generator G (210) is effectively trained to translate images from the style X to the style Y, and the generator F (220) is effectively trained to translate image from the style Y to the style X.

Figure 3:
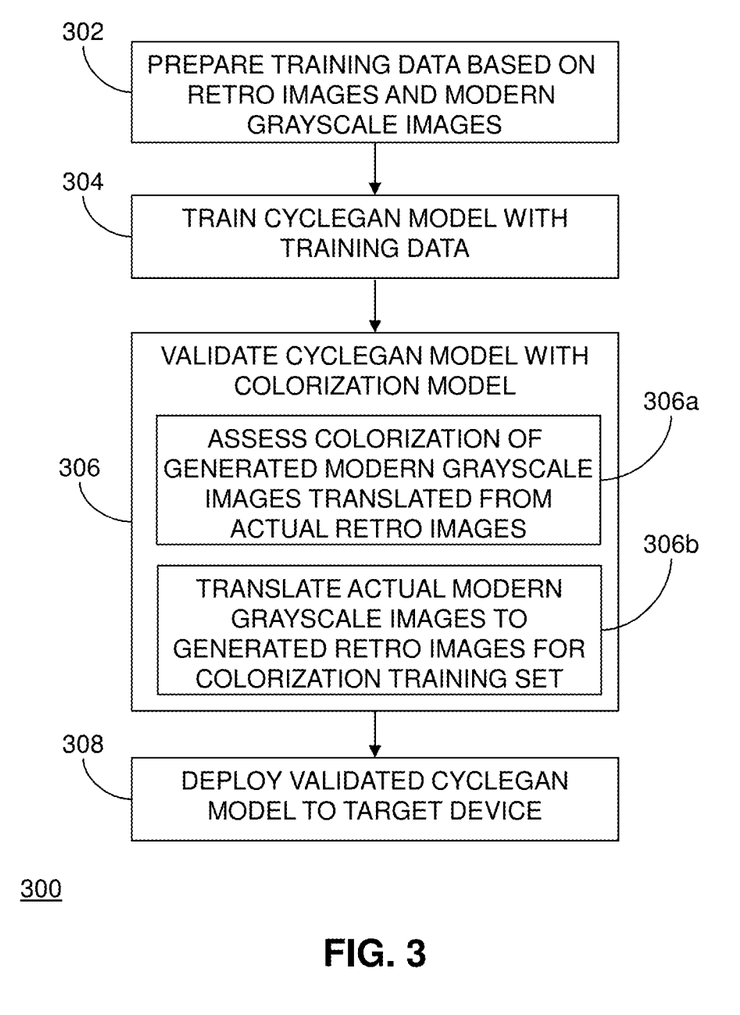
FIG. 3 illustrates an example method for implementing a CycleGAN model with a deep learning model to colorize retro images.

FIG. 3 illustrates an example method 300 for implementing a CycleGAN model with a deep learning model to colorize retro images. In act 302, training data is prepared based on retro images and modern grayscale images. In act 304, the CycleGAN model is trained with the training data as described above.

In act 306, the CycleGAN model is validated with a colorization model. In particular, in act 306a, actual retro images are translated to generated modern grayscale images and the colorization of the generated modern grayscale images (colorization performance) is assessed. Additionally, in act 306b, actual modern grayscale images can be translated to generated retro images for a colorization training dataset with realistic retro images.

In act 308, the validated CycleGAN model is deployed to a target device. In particular, the CycleGAN model is mapped to layers that are supported by the target device, translated to a fixed-point model, and re-calibrated.

Figure 4:
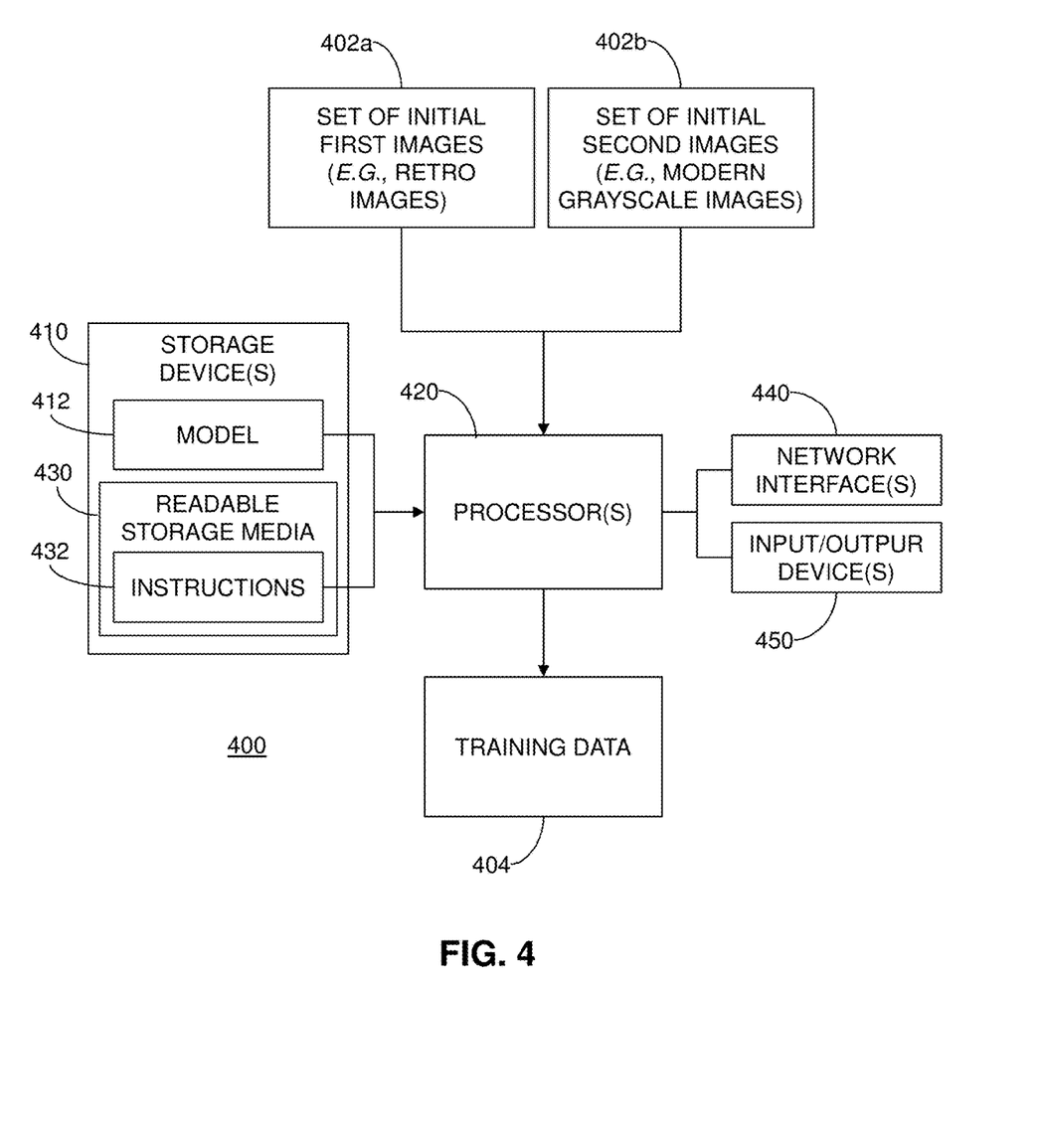
FIG. 4 illustrates an example system for implementing a CycleGAN model to process images for automated colorization.

FIG. 4 illustrates an example system 400 for implementing a CycleGAN model to process images for automated colorization. The system 400 includes one or more computer storage devices 410 configured to store the CycleGAN model 412. The CycleGAN model 412 may include the generator G, the generator F, the critic $D_x$, and the critic $D_y$, as described above.

The system 400 also includes one or more processors 420. The one or more computer storage devices 410 also includes one or more non-transitory computer-readable storage media 430 configured to store instructions 432 for execution by the one or more processors 420. The instructions 432 cause the one or more processors 420 to: (1) receive a set of initial first images 402a; and (2) receive a set of initial second images 402b. Each initial first image 402a presents a respective subject according to a first style X, and the first style X includes one or more first visual features. Each initial second image 402*b* presents a respective subject according to a second style Y. The respective subjects of the initial second images 402*b* are different from the respective subjects of the initial first images 402*a*. The second style Y includes one or more second visual features that are different from the one or more first visual features of the first style X In an example implementation, the one or more first visual features of the first style X may relate to those found in images from retro photographs, and the one or more second visual features of the second style Y may relate to those found in modern grayscale images.

The instructions 432 further cause the one or more processors to: (3) implement the first generator G to produce a set of generated first images based on the initial set of initial first images 402*a*; (4) implement the second generator F to produce a set of generated second images based on the set of initial second images 402*b*; and (5) implement one or more training functions to train the first generator G and the second generator F based on the generated first images and the generated second images. Each generated first image produced by the first generator G presents the subject of a respective one of the initial first images 402*a* according to the second style Y, and each generated second image produced by the second generator F presents the subject of a respective one of the initial second images 402*b* according to the first style X.

The instructions 432 further cause the one or more processors to: (6) implement the first critic $D_x$ to: receive a first random image from the set of initial first images 402*a* or the set of generated second images based on the set of initial second images, and judge whether the first random image has been produced by the second generator F; and (7) implement the second critic $D_y$ to: receive a second random image from the set of initial second images or the set of generated first images based on the set of initial first images, and judge whether the random second image has been produced by the first generator G. The one or more training functions includes an adversary loss function that is implemented to: (i) train the second generator F to increase a probability that the first critic judges the generated second images have not been produced by second generator F, and (ii) train the first generator G to increase a probability that the second critic judges the generated first images have not been produced by the first generator G.

The instructions 432 further cause the one or more processors to: (8) implement the second generator F to produce a set of reconstructed first images based on the set of generated first images; and (9) implement the first generator G to produce a set of reconstructed second images based on the set of generated second images. The one or more training functions includes a cycle-consistency loss function that is implemented to train the first generator and the second generator by (i) minimizing a first loss between the initial first images and the corresponding reconstructed first images, and (ii) minimizing a second loss between the initial second images and the corresponding reconstructed second images.

Accordingly, modern grayscale images with corresponding color images can be translated to images with the characteristics of retro photographs, thereby producing training data 404 that pairs images with the characteristics of retro paragraphs with corresponding color images. This training data 404 can then be employed to train a deep learning model to colorize retro photographs more effectively. Thus, the system 400 may include combining the generated second images in the first style X with colorized images based on the corresponding initial second images to generate a training dataset for a colorization model that colorizes images in the first style X.

In some implementations, the one or more computer storage devices 410 are further configured to store a colorization model configured to colorize a grayscale image, and the instructions 432 further cause the one or more processors to combine the generated second images in the first style X with colorized images based on the corresponding initial second images to generate a training dataset for the colorization model to colorize images in the first style X.

The one or more processors 420 may include one or more central processing units (CPUs), such as one or more general purpose processors and/or one or more dedicated processors (e.g., application specific integrated circuits also known as ASICs or digital signal processors also known as DSPs, etc.). The one or more computer storage devices 410 may include volatile and/or non-volatile data storage and may be integrated in whole or in part with the one or more processors 420. In general, the one or more computer storage devices 410 may store program instructions, executable by the one or more processors 420, and data that are manipulated by these instructions to carry out the various methods, processes, or functions described herein. Alternatively, these methods, processes, or functions can be defined by hardware, firmware, and/or any combination of hardware, firmware and software. Therefore, the one or more computer storage devices 410 may include a tangible, non-transitory computer-readable medium, having stored thereon program instructions that, upon execution by one or more processors, cause the system 400 to carry out any of the methods, processes, or functions disclosed in this specification or the accompanying drawings.

The system 400 may also include a network interface 440 and input/output devices 450, all of which may be coupled by a system bus or a similar mechanism. The network interface 440 may be employed to receive input, such as the set of initial first images 402*a* and the set of initial second images 402*b*, or to provide output. The network interface 440 may take the form of a wire line connection, such as an Ethernet, Token Ring, or T-carrier connection. The network interface 440 may alternatively take the form of a wireless connection, such as WiFi, BLUETOOTH®, or a wide-area wireless connection. However, other forms of physical layer connections and other types of standard or proprietary communication protocols may be used over network interface 440. Furthermore, network interface 440 may comprise multiple physical communication interfaces. Additionally, the computing system 400 may support remote access from another device, via the network interface 440 or via another interface, such as an RS-132 or Universal Serial Bus (USB) port.

The input/output devices 450 may facilitate user interaction with the system 400. The input/output devices 450 may include multiple types of input devices, such as a keyboard, a mouse, a touch screen, a microphone and/or any other device that is capable of receiving input from a user. Similarly, the input/output devices 450 may include multiple types of output devices, such as a printing device, a display, one or more light emitting diodes (LEDs), speaker, or any other device that is capable of providing output discernible to a user. For instance, the printing device can print the output image. Additionally or alternatively, the display device can display the output image.

It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing images, comprising:
providing a set of initial first images, each initial first image presenting a respective subject according to a first style X, the first style X including one or more first visual features;
providing a set of initial second images, each initial second image presenting a respective subject according to a second style Y, the respective subjects of the initial second images being different from the respective subjects of the initial first images, the second style Y including one or more second visual features that are different from the one or more first visual features of the first style X;
implementing a first generator G in a computer processing system to produce a set of generated first images based on the set of initial first images;
implementing a second generator F in the computer processing system to produce a set of generated second images based on the set of initial second images; and
implementing one or more training functions to train the first generator G and the second generator F based on the generated first images and the generated second images, such that: (i) each generated first image produced by the first generator G presents the subject of a respective one of the initial first images according to the second style Y, and (ii) each generated second image produced by the second generator F presents the subject of a respective one of the initial second images according to the first style X.

2. The method of claim 1, further comprising:
implementing a first critic in the computer processing system to:
receive a first random image from the set of initial first images or the set of generated second images based on the set of initial second images, and
judge whether the first random image has been produced by the second generator F; and
implementing a second critic in the computer processing system to:
receive a second random image from the set of initial second images or the set of generated first images based on the set of initial first images, and
judge whether the random second image has been produced by the first generator G,
wherein the one or more training functions includes an adversary loss function that is implemented to: (i) train the second generator F to increase a probability that the first critic judges the generated second images have not been produced by second generator F, and (ii) train the first generator G to increase a probability that the second critic judges the generated first images have not been produced by the first generator G.

3. The method of claim 2, wherein the first critic and the second critic each include four convolution layers all followed by batch normalization and Leaky rectified linear unit (ReLU) activations.

4. The method of claim 1, further comprising:
implementing the second generator F to produce a set of reconstructed first images based on the set of generated first images; and
implementing the first generator G to produce a set of reconstructed second images based on the set of generated second images,
wherein the one or more training functions includes a cycle-consistency loss function that is implemented to train the first generator and the second generator by: (i) minimizing a first loss between the initial first images and the corresponding reconstructed first images, and (ii) minimizing a second loss between the initial second images and the corresponding reconstructed second images.

5. The method of claim 1, wherein, relative to the one or more second visual features of the second style Y, the one or more first visual features of the first style X include more noise, include sepia or cyanotype monochrome, appear more overexposed, and/or have less contrast or more softness due to a lower resolution.

6. The method of claim 5, further comprising colorizing, with a colorization model in the computer processing system, the generated first images of the second style Y, and assessing colorization performance by the colorization model based on the colorized generated first images.

7. The method of claim 5, further comprising combining the generated second images in the first style X with colorized images based on the corresponding initial second images to generate a training dataset for a colorization model that colorizes images in the first style X.

8. The method of claim 1, wherein the first generator G and the second generator F each include an encoder and a decoder, the encoder including three convolution layers all followed by batch normalization and ReLU activations, and the decoder including two transposed convolution layers.

9. A system for processing images, the system comprising:
one or more computer storage devices configured to store a first generator G and a second generator F; and
one or more processors configured to execute instructions, the instructions causing the one or more processors to:
receive an set of initial first images, each initial first image presenting a respective subject according to a first style X, the first style X including one or more first visual features;
receive an set of initial second images, each initial second image presenting a respective subject according to a second style Y, the respective subjects of the initial second images being different from the respective subjects of the initial first images, the second style Y including one or more second visual features that are different from the one or more first visual features of the first style X;
implement the first generator G to produce a set of generated first images based on the set of initial first images;

implement the second generator F to produce a set of generated second images based on the set of initial second images; and implement one or more training functions to train the first generator G and the second generator F based on the generated first images and the generated second images, such that: (i) each generated first image produced by the first generator G presents the subject of a respective one of the initial first images according to the second style Y, and (ii) each generated second image produced by the second generator F presents the subject of a respective one of the initial second images according to the first style X.

10. The system of claim 9, wherein the one or more computer storage devices are further configured to store a first critic and a second critic, and the instructions further cause the one or more processors to:

implement the first critic to:
receive a first random image from the set of initial first images or the set of generated second images based on the set of initial second images, and
judge whether the first random image has been produced by the second generator F; and implement the second critic to:
receive a second random image from the set of initial second images or the set of generated first images based on the set of initial first images, and
judge whether the random second image has been produced by the first generator G, wherein the one or more training functions includes an adversary loss function that is implemented to: (i) train the second generator F to increase a probability that the first critic judges the generated second images have not been produced by second generator F, and (ii) train the first generator G to increase a probability that the second critic judges the generated first images have not been produced by the first generator G.

11. The system of claim 9, wherein the instructions further cause the one or more processors to:

implement the second generator F to produce a set of reconstructed first images based on the set of generated first images; and implement the first generator G to produce a set of reconstructed second images based on the set of generated second images, wherein the one or more training functions includes a cycle-consistency loss function that is implemented to train the first generator and the second generator by: (i) minimizing a first loss between the initial first images and the corresponding reconstructed first images, and (ii) minimizing a second loss between the initial second images and the corresponding reconstructed second images.

12. The system of claim 9, wherein, relative to the one or more second visual features of the second style Y, the one or more first visual features of the first style X include more noise, include sepia or cyanotype monochrome, appear more overexposed, and/or have less contrast or more softness due to a lower resolution.

13. The system of claim 12, wherein the one or more computer storage devices are further configured to store a colorization model configured to colorize a grayscale image, and the instructions further cause the one or more processors to:

colorize, with the colorization model, the generated first images of the second style Y, and assess colorization performance by the colorization model based on the colorized generated first images.

14. The system of claim 12, wherein the one or more computer storage devices are further configured to store a colorization model configured to colorize a grayscale image, and the instructions further cause the one or more processors to:

combine the generated second images in the first style X with colorized images based on the corresponding initial second images to generate a training dataset for the colorization model to colorize images in the first style X.

15. One or more non-transitory computer-readable storage media, having computer-executable instructions stored thereon, wherein when executed by a one or more processors, the instructions cause the one or more processors to:

receive an set of initial first images, each initial first image presenting a respective subject according to a first style X, the first style X including one or more first visual features;

receive an set of initial second images, each initial second image presenting a respective subject according to a second style Y, the respective subjects of the initial second images being different from the respective subjects of the initial first images, the second style Y including one or more second visual features that are different from the one or more first visual features of the first style X;

implement a first generator G to produce a set of generated first images based on the set of initial first images;

implement a second generator F to produce a set of generated second images based on the set of initial second images; and implement one or more training functions to train the first generator G and the second generator F based on the generated first images and the generated second images, such that: (i) each generated first image produced by the first generator G presents the subject of a respective one of the initial first images according to the second style Y, and (ii) each generated second image produced by the second generator F presents the subject of a respective one of the initial second images according to the first style X.

16. The one or more non-transitory computer-readable storage media of claim 15, wherein the instructions further cause the one or more processors to:

implement a first critic to:
receive a first random image from the set of initial first images or the set of generated second images based on the set of initial second images, and
judge whether the first random image has been produced by the second generator F; and implement a second critic to:
receive a second random image from the set of initial second images or the set of generated first images based on the set of initial first images, and
judge whether the random second image has been produced by the first generator G, wherein the one or more training functions includes an adversary loss function that is implemented to: (i) train the second generator F to increase a probability that the first critic judges the generated second images have not been produced by second generator F, and (ii) train the first generator G to increase a probability that the second critic judges the generated first images have not been produced by the first generator G.

17. The one or more non-transitory computer-readable storage media of claim 15, wherein the instructions further cause the one or more processors to:
- implement the second generator F to produce a set of reconstructed first images based on the set of generated first images; and
- implement the first generator G to produce a set of reconstructed second images based on the set of generated second images,
- wherein the one or more training functions includes a cycle-consistency loss function that is implemented to train the first generator and the second generator by: (i) minimizing a first loss between the initial first images and the corresponding reconstructed first images, and (ii) minimizing a second loss between the initial second images and the corresponding reconstructed second images.

18. The one or more non-transitory computer-readable storage media of claim 15, wherein, relative to the one or more second visual features of the second style Y, the one or more first visual features of the first style X include more noise, include sepia or cyanotype monochrome, appear more overexposed, and/or have less contrast or more softness due to a lower resolution.

19. The one or more non-transitory computer-readable storage media of claim 18, wherein the instructions further cause the one or more processors to:
- colorize, with a colorization model, the generated first images of the second style Y, and
- assess colorization performance by the colorization model based on the colorized generated first images.

20. The one or more non-transitory computer-readable storage media of claim 18, wherein the instructions further cause the one or more processors to combine the generated second images in the first style X with colorized images based on the corresponding initial second images to generate a training dataset for a colorization model configured to colorize images in the first style X.

* * * * *